(12) United States Patent
Chen et al.

(10) Patent No.: US 12,133,270 B2
(45) Date of Patent: Oct. 29, 2024

(54) COMMUNICATION SYSTEM

(71) Applicant: NEC Corporation, Tokyo (JP)

(72) Inventors: Yuhua Chen, Surrey (GB); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 17/625,860

(22) PCT Filed: Mar. 4, 2021

(86) PCT No.: PCT/JP2021/008348
§ 371 (c)(1),
(2) Date: Jan. 10, 2022

(87) PCT Pub. No.: WO2021/192882
PCT Pub. Date: Sep. 30, 2021

(65) Prior Publication Data
US 2022/0279594 A1    Sep. 1, 2022

(30) Foreign Application Priority Data
Mar. 27, 2020    (GB) ..................... 2004520

(51) Int. Cl.
*H04W 74/0833*    (2024.01)
*H04W 28/02*    (2009.01)
(Continued)

(52) U.S. Cl.
CPC ... *H04W 74/0841* (2013.01); *H04W 28/0263* (2013.01); *H04W 28/0268* (2013.01);
(Continued)

(58) Field of Classification Search
CPC . H04W 74/0841; H04W 76/20; H04W 72/23; H04W 28/0263; H04W 28/0268; H04W 74/0866
See application file for complete search history.

(56) References Cited

U.S. PATENT DOCUMENTS

2018/0302914 A1    10/2018    Da Silva et al.
2019/0037447 A1    1/2019    Lee et al.
(Continued)

FOREIGN PATENT DOCUMENTS

EP    3737201 A1    11/2020
WO    2019/047078 A1    3/2019
(Continued)

OTHER PUBLICATIONS

Japanese Office Action for JP Application No. 2022-504711, mailed on Nov. 22, 2022 with English Translation.
(Continued)

*Primary Examiner* — Ajay Cattungal
(74) *Attorney, Agent, or Firm* — Sughrue Mion, PLLC

(57) ABSTRACT

A system is disclosed in which a user equipment (UE) performs small data transmissions in Radio Resource Control (RRC) Inactive state. The UE receives information configuring small data transmissions via a control-plane, and when there is uplink data to be sent as a small data transmission, the UE generates and transmits an RRC message comprising said small data transmission using a Signalling Radio Bearer (SRB) provided via a Common Control Channel (CCCH).

13 Claims, 10 Drawing Sheets

(51) Int. Cl.
*H04W 72/23* (2023.01)
*H04W 74/08* (2009.01)
*H04W 76/20* (2018.01)

(52) U.S. Cl.
CPC ....... *H04W 72/23* (2023.01); *H04W 74/0866* (2013.01); *H04W 76/20* (2018.02)

(56) References Cited

U.S. PATENT DOCUMENTS

| | | | |
|---|---|---|---|
| 2019/0380154 A1 | 12/2019 | Wei et al. | |
| 2020/0137808 A1* | 4/2020 | Hole | H04W 74/0891 |
| 2020/0205215 A1 | 6/2020 | Hong | |
| 2020/0374966 A1 | 11/2020 | Chang et al. | |
| 2021/0058972 A1 | 2/2021 | Choe et al. | |
| 2021/0360392 A1* | 11/2021 | Xu | H04W 36/12 |
| 2021/0360730 A1 | 11/2021 | Kim et al. | |
| 2022/0132589 A1* | 4/2022 | Bao | H04W 74/0833 |
| 2022/0279594 A1* | 9/2022 | Chen | H04W 76/27 |
| 2023/0013851 A1* | 1/2023 | Lin | H04W 72/23 |

FOREIGN PATENT DOCUMENTS

| | | |
|---|---|---|
| WO | 2019/134566 A1 | 7/2019 |
| WO | 2019/160311 A1 | 8/2019 |
| WO | 2019/216730 A1 | 11/2019 |

OTHER PUBLICATIONS

RP-170376, TSG RAN, Kazuaki Takeda, "Study on New Radio Access Technology" [online], 3GPP TSG RAN #75, Dubrovnik, Croatia, Mar. 6-9, 2017.
R2-1700185, Huawei, "UL data transmission without RRC signalling without initiating transition to active (option A)", 3GPP TSG-RAN NR Adhoc, Spokane (WA), USA, Nov. 14-18, 2016.
S3-192018,Ericsson, "CIOT: New solution for UP IP in PDCP to protect UL EDT data in Msg3", 3GPP TSG-SA WG3 Meeting #95-BIS, Sapporo (Japan), Jun. 24-28, 2019.
R2-1704649, ZTE, "Discussion on the SDAP PDU format" [online], 3GPP TSG-RAN WG2 Meeting #98, Hangzhou, China, May 15-19, 2017.
International Search Report for PCT Application No. PCT/JP2021/008348, mailed on Jun. 21, 2021.
English translation of Written opinion for PCT Application No. PCT/JP2021/008348, mailed on Jun. 21, 2021.
GB Office Action for GB Application No. GB2004520.9, mailed on Aug. 24, 2020.
Next Generation Mobile Networks, "NGMN 5G White Paper", V1.0, Feb. 17, 2015, pp. 1-125.
ZTE Corporation, "Work Item on NR smalldata transmissions in Inactive state", 3GPP TSG RAN Meeting #86, Sitges, Spain, Dec. 9-12, 2019, RP-193252, pp. 1-4.
3GPP TS 22.368 V13.1.0, "Service requirements for Machine-Type Communications", Dec. 2014, pp. 1-26.
JP Official Communication for Japanese Patent Application No. 2023-111102, mailed on Jun. 11, 2024 with English Translation.
CN Office Action for Chinese Patent Application No. 202180023609.9, mailed on Aug. 27, 2024 with English Translation.
Samsung, "Data transfer in inactive state based on 4-step RACH procedures", 3GPP TSG-RAN WG2 #97, R2-1701529, Feb. 17, 2017.
Huawei, HISilicon, "UL data transmission in RRC_Inactive", 3GPP TSG-RAN WG2 #96, R2-168544, Nov. 5, 2016.
Mediatek Inc, "Procedure for Data transmission", 3GPP TSG-RAN2 #96 Meeting, R2-168814, Nov. 18, 2016.

* cited by examiner

COMMUNICATION SYSTEM

This application is a National Stage Entry of PCT/JP2021/008348 filed on Mar. 4, 2021, which claims priority from British Patent Application GB2004520.9 filed on Mar. 27, 2020, the contents of all of which are incorporated herein by reference, in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof (including LTE-Advanced and Next Generation or 5G networks). The invention has particular, although not necessarily exclusive relevance to transmission of small data for user equipment in inactive state.

BACKGROUND ART

Recent developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an 'eNB' in LTE, 'gNB' in 5G) is the base station via which communication devices (user equipment or 'UE') connect to a core network and communicate to other communication devices or remote servers. For simplicity, the present application will use the term base station to refer to any such base stations.

For simplicity, the present application will use the term mobile device, user device, or UE to refer to any communication device that is able to connect to the core network via one or more base stations.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems, and the like. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

For simplicity, the present application often refers to mobile devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

The core network (i.e. the 'EPC' in case of LTE and '5GC' in 5G) typically hosts functionality for subscriber management, mobility management, charging, security, and call/session management (amongst others), and provides connection for communication devices to external networks, such as the Internet.

Before a UE can communicate data via a base station, it needs to perform a so-called (contention-based) random access procedure with the base station serving the cell in which the UE is located. Currently, in Release 15, the random access procedure is a four-step procedure. In the first step (referred to as 'Msg1'), the UE transmits a Physical Random Access Channel (PRACH) preamble. If the base station detects the preamble, the base station responds with a random access response (RAR), also known as 'Msg2'. The RAR includes the detected preamble identifier, a time-advance command, a temporary C-RNTI (TC-RNTI), and an uplink (UL) grant for scheduling a Physical Uplink Shared Channel (PUSCH) transmission from the UE (referred to as 'Msg3'). The UE transmits Msg3 as scheduled and includes an identifier for contention resolution. Upon receiving Msg3, the network transmits a contention resolution message, also known as 'Msg4', with the contention resolution identifier. If the UE successfully receives Msg4, and if it finds its contention resolution identifier, it sends an acknowledgement on the Physical Uplink Control Channel (PUCCH), which completes the four-step random access procedure.

From Release 16 of the 3GPP standards, a two-step random access procedure has been proposed (in addition to the currently used four-step Random Access procedure). The two-step random access is mainly intended for supporting (Ultra) Low Latency Communications, 10 ms control-plane (CP) latency, fast handover, efficient channel access in unlicensed spectrum, and transmission of small data packets, amongst others. As can be seen, the four-step random access procedure requires two round-trip cycles between the UE and the base station. The two-step random access procedure aims to reduce latency and control-signaling overhead by using a single round trip cycle between the UE and the base station. Effectively, this is achieved by combining the UE's PRACH preamble (Msg1) transmission and the scheduled PUSCH transmission (Msg3) into a single message (referred to as 'MsgA'). Similarly, the random-access response (RAR/Msg2) from the base station to UE and the contention resolution message (Msg4) are combined in the two-step random access procedure (and referred to as 'MsgB').

Following the random access procedure, the UE enters to so-called Radio Resource Control (RRC) CONNECTED state and it can start sending/receiving data (both user-plane data and control-plane data) using resources allocated by (a base station of) the network. The UE's transition between RRC states is controlled by the network (using associated timers etc.). Typically, when a UE has no more data to send/receive, it is instructed by the network to move to the so-called RRC IDLE state, in order to free up network resources and to save battery at the UE's side. Every time the UE has data to send or receive, it needs to enter the RRC CONNECTED state again (after performing an appropriate random access procedure with the network). Whilst generally the RRC IDLE state is the most power efficient state, some UEs may need to transition between RRC IDLE and RRC CONNECTED frequently which results in increasing signalling and may adversely affect their power consumption as well.

In LTE, 3GPP attempted to address this issue in various ways, including Control-Plane Earlier Data Transmission (CP-EDT) and User-Plane Earlier Data Transmission (UP-EDT) which may be used by UEs in RRC IDLE state.

In case of CP-EDT, data is included in a Non-Access Stratum (NAS) container and then put into an appropriate Common Control Channel (CCCH) RRC message. The NAS container is forwarded to the S-GW by the MME. As the data is sent via the Control-Plane, no Data Radio Bearer (DRB) is used. Thus, the UE remains in RRC IDLE (unless the network instructs it to move to RRC CONNECTED). CP-EDT does not use Access Stratum (AS) security thus the PDCP and RLC layers are not involved in the transmission of the data (NAS container).

In case of UP-EDT, data is sent via the User-Plane, after resuming an appropriate DRB. The data is ciphered and transmitted on the Dedicated Traffic Channel (DTCH), multiplexed with a RRCConnectionResumeRequest in the CCCH at the MAC layer. In this case, the base station re-activates the S1-U bearers for the UE and forwards the data to S-GW directly.

The 3GPP NR standards introduced the so-called RRC INACTIVE state, in addition to RRC IDLE and RRC CONNECTED. In the RRC INACTIVE state all DRBs and Signalling Radio Bearers (SRBs) are suspended, except 'SRB0'. However the UE's Ng-U and Ng-C connections are maintained (unlike in RRC IDLE), which means that only the CCCH channel is active (for SRB0). Thus, when new data arrives from an upper layer, it cannot be transmitted immediately. Data can only be transmitted after performing an RRC resume procedure, which causes the UE to resume (or reconfigure) all its DRB and SRBs. A difference compared to UP-EDT is that the DRBs are resumed immediately upon data arrival and data can be transmitted via DRB/ DTCH/PUSCH, as appropriate.

For UEs in the RRC INACTIVE state, 3GPP intends to support certain communications (typically, a relatively small amount of data) without the UE having to (re-)activate/ resume its RRC connection with the network. This functionality is referred to as 'small data transmission' and it is applicable to a number of traffic types, such as infrequent transmissions, short data bursts, and low throughput transmissions. Some of the benefits associated with small data transmission include a reduction in signalling overhead associated with RRC state transitions, lower battery consumption, and lower latency (compared to the case when the UE needs to transition into RRC connected state).

The motivation behind small data transmissions for UEs in INACTIVE state is described in 3GPP work item no. RP-193252. In summary, the small data transmission feature allows a UE to remain in the RRC INACTIVE state for certain downlink (mobile terminated, 'MT') and uplink (mobile originated, 'MO') data transmissions. In other words, the UE does not need to resume its RRC connection (i.e. move to the RRC CONNECTED state) for data transmission and it does not need to subsequently release the connection (back to RRC INACTIVE state) after data transmission, thereby the UE 3 can avoid some of the associated drawbacks (e.g. increased power consumption and signalling overhead).

In Rel-17 small and infrequent data traffic will be allowed in INACTIVE state in the following use cases (amongst others):
Smartphone applications:
 traffic from Instant Messaging services (e.g. Whatsapp, QQ, Wechat etc.);
 heart-beat/keep-alive traffic from instant messaging/ email clients and similar applications;
 push notifications from various applications;
Non-smartphone applications:
 traffic from wearables (periodic positioning information etc.);
 sensors (Industrial Wireless Sensor Networks transmitting temperature, pressure readings periodically or in an event triggered manner etc.); and
 smart meters and smart meter networks sending periodic meter readings.

Signalling overhead from INACTIVE state UEs for small data packets is a general problem and will become a critical issue with more UEs in NR not only for network performance and efficiency but also for the UE battery performance. In general, any device that has intermittent small data packets in INACTIVE state will benefit from enabling small data transmission in INACTIVE.

Although some of the key enablers for small data transmission in NR have already been specified in Rel-15 and Rel-16 (such as the RRC INACTIVE state, 2-step/4-step random access, and configured grant type-1), there are still a number of issues and objectives that need to be addressed, for example:
In case of UL small data transmissions using 2-step or 4-step random access:
 There is no procedure to enable user-plane (UP) data transmission for small data packets from a UE in RRC INACTIVE state (e.g. using MsgA of the 2-step random access procedure or Msg3 of the 4-step random access procedure);
 Need to enable flexible payload sizes larger than the Rel-16 CCCH message size currently defined for RRC INACTIVE state for MsgA and Msg3 in order to support UP data transmission in UL;
 Need to define context fetch and data forwarding procedures (with and without anchor relocation) in RRC INACTIVE state for random access based solutions;
In case of transmission of UL data on pre-configured PUSCH resources (using the so-called 'configured grant type 1'):
 There is no procedure for small data transmission over configured grant type 1 resources in RRC INACTIVE state; and
 Configured grant type1 resources are not configured for UL small data transmission in RRC INACTIVE state.

SUMMARY OF INVENTION

Accordingly, preferred example embodiments of the present invention aim to provide methods and apparatus which address or at least partially deal with one or more of the above issues.

Although for efficiency of understanding for those of skill in the art, the invention will be described in detail in the context of a 3GPP system (UMTS, LTE, NR), the principles of the invention can be applied to other systems in which communication devices or User Equipment (UE) access a core network using a radio access technology.

In one example aspect, the invention provides a method performed by a user equipment (UE) for small data transmission in Radio Resource Control (RRC) Inactive state, the method comprising: receiving information configuring small data transmissions via a control-plane; determining, whilst the UE is in the RRC Inactive state, whether there is uplink data to be sent as a small data transmission; generating an RRC message comprising said small data transmission; and transmitting said RRC message comprising said small data transmission using a Signalling Radio Bearer (SRB) provided via a Common Control Channel (CCCH).

In another example aspect, the invention provides a method performed by a user equipment (UE) for small data transmission in Radio Resource Control (RRC) Inactive state, the method comprising: receiving information configuring small data transmissions in the RRC Inactive state; determining, whilst when the UE is in the RRC Inactive state, whether there is uplink data to be sent as a small data transmission; processing the uplink data to form a small data transmission and adding information identifying the UE; and transmitting said small data transmission and said information identifying the UE using a Data Radio Bearer (DRB) based on the received information.

In one example aspect, the invention provides a method performed by a communication apparatus of a radio access network for communicating with a user equipment (UE) for small data transmission in a Radio Resource Control (RRC) Inactive state, the method comprising: transmitting information configuring small data transmissions via a control-plane; and receiving, from the UE whilst the UE is in the RRC Inactive state, an RRC message comprising a small data transmission using a Signalling Radio Bearer (SRB) provided via a Common Control Channel (CCCH).

In one example aspect, the invention provides a method performed by a communication apparatus of a radio access network for communicating with a user equipment (UE) for small data transmission in Radio Resource Control (RRC) Inactive state, the method comprising: transmitting information configuring small data transmissions in the RRC Inactive state; and receiving, from the UE whilst the UE is in the RRC Inactive state, a small data transmission and information identifying the UE using a Data Radio Bearer (DRB) based on the transmitted information.

In one example aspect, the invention provides a user equipment (UE) for small data transmission in Radio Resource Control (RRC) Inactive state, the UE comprising: means for receiving information configuring small data transmissions via a control-plane; means for determining, whilst the UE is in the RRC Inactive state, whether there is uplink data to be sent as a small data transmission; means for generating an RRC message comprising said small data transmission; and means for transmitting said RRC message comprising said small data transmission using a Signalling Radio Bearer (SRB) provided via a Common Control Channel (CCCH).

In one example aspect, the invention provides a user equipment (UE) for small data transmission in Radio Resource Control (RRC) Inactive state, the UE comprising: means for receiving information configuring small data transmissions in the RRC Inactive state; means for determining, when the UE is in the RRC Inactive state, whether there is uplink data to be sent as a small data transmission; means for processing the uplink data to form a small data transmission and adding information identifying the UE; and means for transmitting said small data transmission and said information identifying the UE using a Data Radio Bearer (DRB) based on the received information.

In another example aspect, the invention provides a communication apparatus of a radio access network for communicating with a user equipment (UE) for small data transmission in a Radio Resource Control (RRC) Inactive state, the communication apparatus comprising: means for transmitting information configuring small data transmissions via a control-plane; and means for receiving, from the UE whilst the UE is in the RRC Inactive state, an RRC message comprising a small data transmission using a Signalling Radio Bearer (SRB) provided via a Common Control Channel (CCCH).

In yet another example aspect, the invention provides a communication apparatus of a radio access network for communicating with a user equipment (UE) for small data transmission in Radio Resource Control (RRC) Inactive state, the communication apparatus comprising: means for transmitting information configuring small data transmissions in the RRC Inactive state; and means for receiving, from the UE whilst the UE is in the RRC Inactive state, a small data transmission and information identifying the UE using a Data Radio Bearer (DRB) based on the transmitted information.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Figure 1:
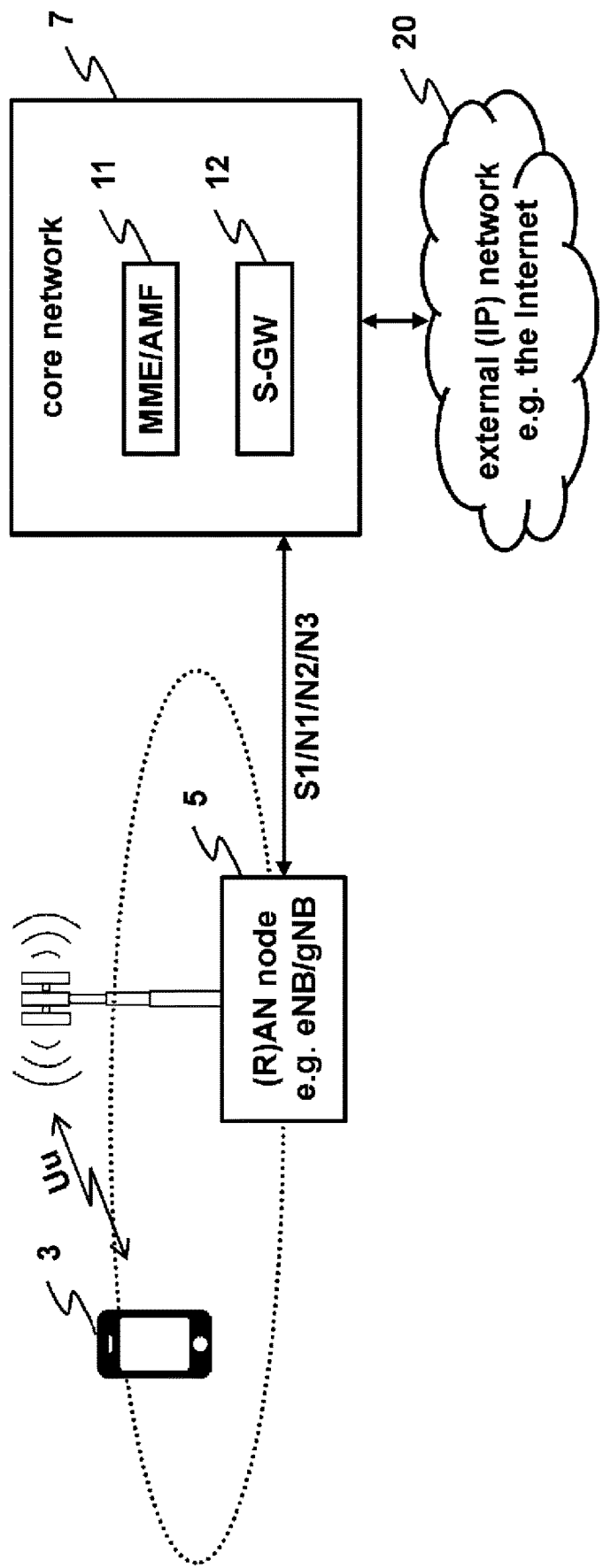
FIG. 1 illustrates schematically a mobile (cellular or wireless) telecommunication system to which example embodiments of the invention may be applied.

FIG. 1 schematically illustrates a mobile (cellular or wireless) telecommunication system 1 to which example embodiments of the present invention are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others, a Mobility Management Entity (MME) 11 and a Serving Gateway (S-GW) 12. In NR networks, a so-called Access and Mobility Management Function (AMF) may be provided instead of, or in addition to, the MME 11. From the core network 7, connection to an external IP network 20 (such as the Internet) may also be provided.

The system supports both legacy (i.e. four-step) and two-step random access procedures. Certain UEs 3 may also be configured to communicate without an explicit grant from the network, using resources allocated to configured grant type-1 communications.

The nodes of this network 1 are configured to support small data transmission services for UEs 3 in RRC INACTIVE state. Such small data transmissions may be realised either via the Control-Plane (first option) or the User-Plane (second option).

In case of the first option, the UE 3 is configured (by the network) to perform small data transmissions via the Control-Plane. The UE 3 may be configured using an RRC release message or an RRC suspension message (and/or the like). When there is uplink data that can be sent as small data, the UE 3 generates an RRC message (e.g. a 'smallDataTransmission' message and/or the like) and transmits this message within an appropriately formatted CCCH message (via the signalling radio bearer 'SRB0' which remains active during RRC INACTIVE mode). The CCCH message containing the small data transmission (within the RRC message) may be transmitted either via a pre-configured PUSCH resource (if available) or using an appropriate (2-step or 4-step) random access procedure. If a random access procedure is used, the above described CCCH message may be transferred to the network (i.e. the base station 5) within either MsgA or Msg3.

In case of the second option, the UE 3 may be configured with a DRB for small data transmissions. When the UE 3 is in RRC INACTIVE mode, it suspends all other DRBs and SRBs. Therefore, any uplink data may be processed through the appropriate User-Plane protocol of the DRB configured for small data transmissions. The data may be transmitted either via a pre-configured PUSCH resource (if available) or by triggering an appropriate (2-step/4-step) random access procedure. In this case the MAC layer is configured to add appropriate information identifying the UE 3 (e.g. 'UE ID') to the uplink transmission.

In summary, the above described system provides a number of benefits, for example:
efficiency and flexibility for low throughput short data bursts;
support for efficient signalling mechanisms (e.g. signalling is less than payload); and
reduction in overall signalling overhead.

Mobile Device

Figure 2:
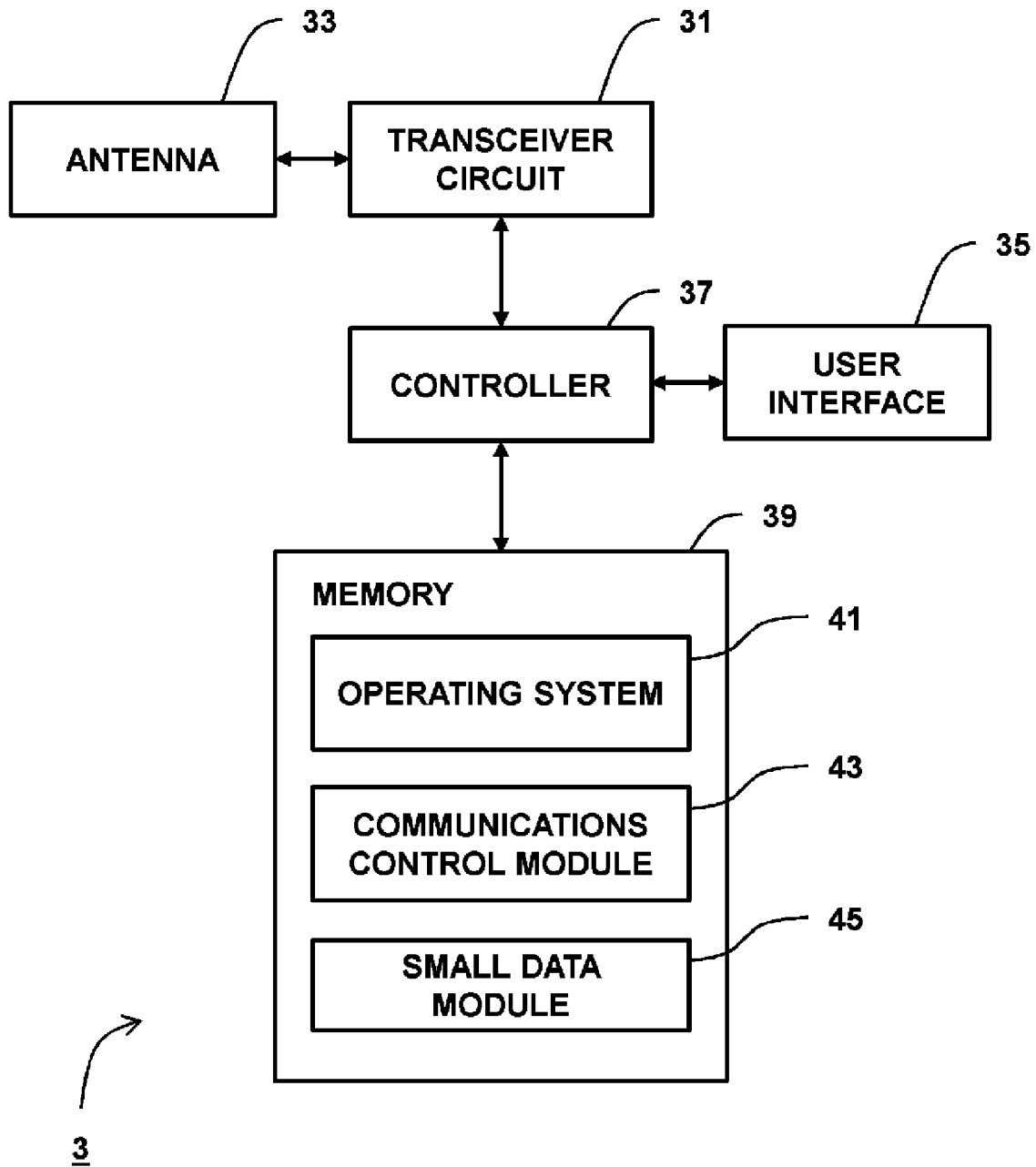
FIG. 2 is a block diagram of a User Equipment (UE) forming part of the system shown in FIG. 1.

FIG. 2 is a block diagram illustrating the main components of the mobile device 3 shown in FIG. 1 (e.g. a mobile telephone or an IoT device). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within memory 39. As shown, these software instructions include, among other things, an operating system 41, a communications control module 43, and a small data module 45.

The communications control module 43 is operable to control the communication between the mobile device 3 and its serving base station 5 (and other communication devices connected to the serving base station 5, such as other user equipment, core network nodes, etc.).

The small date module 45 is responsible for communicating small data transmissions, which may be sent (or received) without the mobile device 3 having an active RRC connection (for example while the mobile device 3 is in the RRC INACTIVE state).

Although not shown in FIG. 2, the mobile device 3 will also typically include respective modules corresponding to the different communication layers. These modules may be implemented as part of the communications control module 43 and include one or more of the following: a Non-Access Stratum (NAS) module, a Radio Resource Control (RRC) module, a Service Data Adaptation Protocol (SDAP) module, a Packet Data Convergence Protocol (PDCP) module, a Radio Link Control (RLC) module, a Medium Access Control (MAC) module, and a physical layer (PHY) module.

The RRC module is operable to generate, send and receive signalling messages formatted according to the RRC standard. For example, such messages are exchanged between the mobile device 3 and its serving base station 5. The RRC messages may include, for example, messages relating to small data transmission (or reception) including messages carrying small data transmissions and associated information. The RRC module is also responsible for managing the mobile device's Radio Resource Control connection with the network and its RRC mode (e.g. RRC IDLE, RRC CONNECTED, and RRC INACTIVE).

The NAS module is operable to generate, send and receive signalling messages formatted according to the NAS standard. For example, such messages are exchanged between the mobile device 3 and the MME/AMF 11 (via the serving base station 5, using the RRC module). The NAS messages may include, for example, messages relating to registering and/or updating a tracking area (or cell) where the mobile device 3 is currently located. The NAS messages may also include small data transmissions.

Base Station

Figure 3:
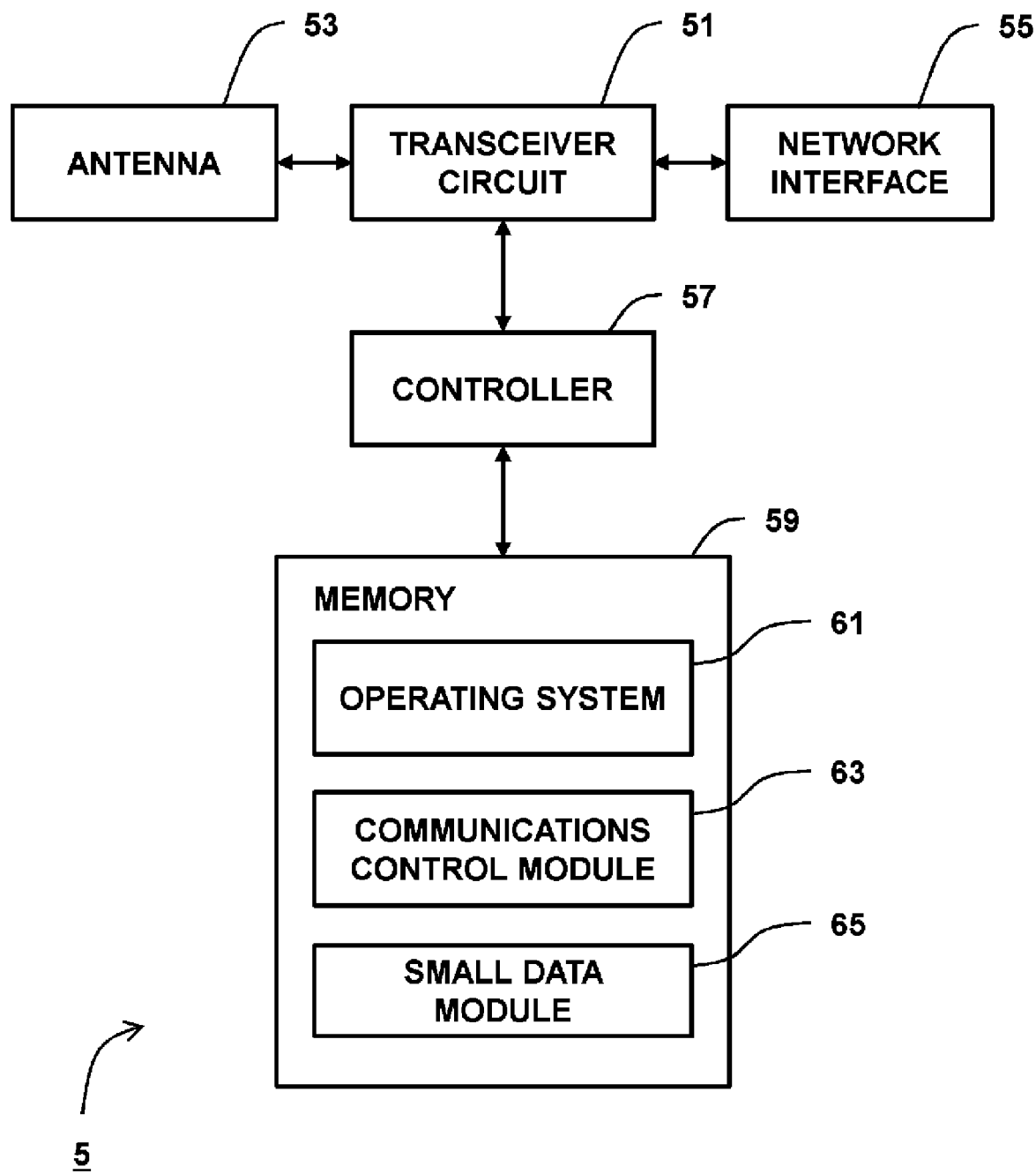
FIG. 3 is a block diagram of a base station forming part of the system shown in FIG. 1.

FIG. 3 is a block diagram illustrating the main components of a base station 5 shown in FIG. 1. As shown, the base station 5 has a transceiver circuit 51 for transmitting signals to and for receiving signals from user equipment (such as the mobile device 3) via one or more antenna 53, a core network interface 55 (e.g. an S1 interface, NG-C interface, and/or the like) for transmitting signals to and for receiving signals from the core network 7, and a base station interface 56 (e.g. an X2 interface, Xn interface, and/or the like) for transmitting signals to and for receiving signals from neighbouring base stations. The base station 5 has a controller 57 to control the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, at least a communications control module 63, and a small data module 65.

The communications control module 63 is responsible for handling (generating/sending/receiving) signalling between the base station 5 and other nodes, such as the UE 3 and the core network nodes. Such signalling may include, for example, control data for managing operation of the mobile device 3 (e.g. NAS, RRC, paging, system information, and/or the like).

The small date module 65 is responsible for handling small data transmissions for the mobile device 3 (for example while the mobile device 3 is in the RRC INACTIVE state).

Although not shown in FIG. 3, the base station 5 will also typically include a base station to base station interface module (e.g. X2/Xn module), an appropriate core network interface module (which may be implemented as part of the communications control module 43), and respective modules corresponding to the different communication layers (e.g. RRC module, SDAP module, PDCP module, RLC module, MAC module, and PHY module).

The base station to base station interface module is operable to generate, send and receive signalling messages (X2/Xn messages) formatted according to the X2AP (or XnAP) standard. The X2/Xn messages may include, for example, messages relating to paging a mobile device 3, handover, data forwarding, transferring/fetching of UE context (and other information relating to the mobile device 3) between neighbouring base stations.

The core network interface module is operable to generate, send and receive signalling messages formatted according to the NG-C standard (or the S1AP standard in LTE), including messages carrying small data transmissions for the UE 3. For example, such messages are exchanged between the base station 5 and the MME/AMF 11 and/or the S-GW 12.

The RRC module is operable to generate, send and receive signalling messages formatted according to the RRC standard. For example, such messages are exchanged between the base station 5 and the mobile device 3 (and other user equipment within the cell of the base station 5). The RRC messages may include, for example, messages relating to small data transmission (or reception) including messages carrying small data transmissions and associated information. The RRC module is also responsible for managing the mobile device's Radio Resource Control connection with the network and its RRC mode (e.g. RRC IDLE, RRC CONNECTED, and RRC INACTIVE).

Core Network Node

Figure 4:
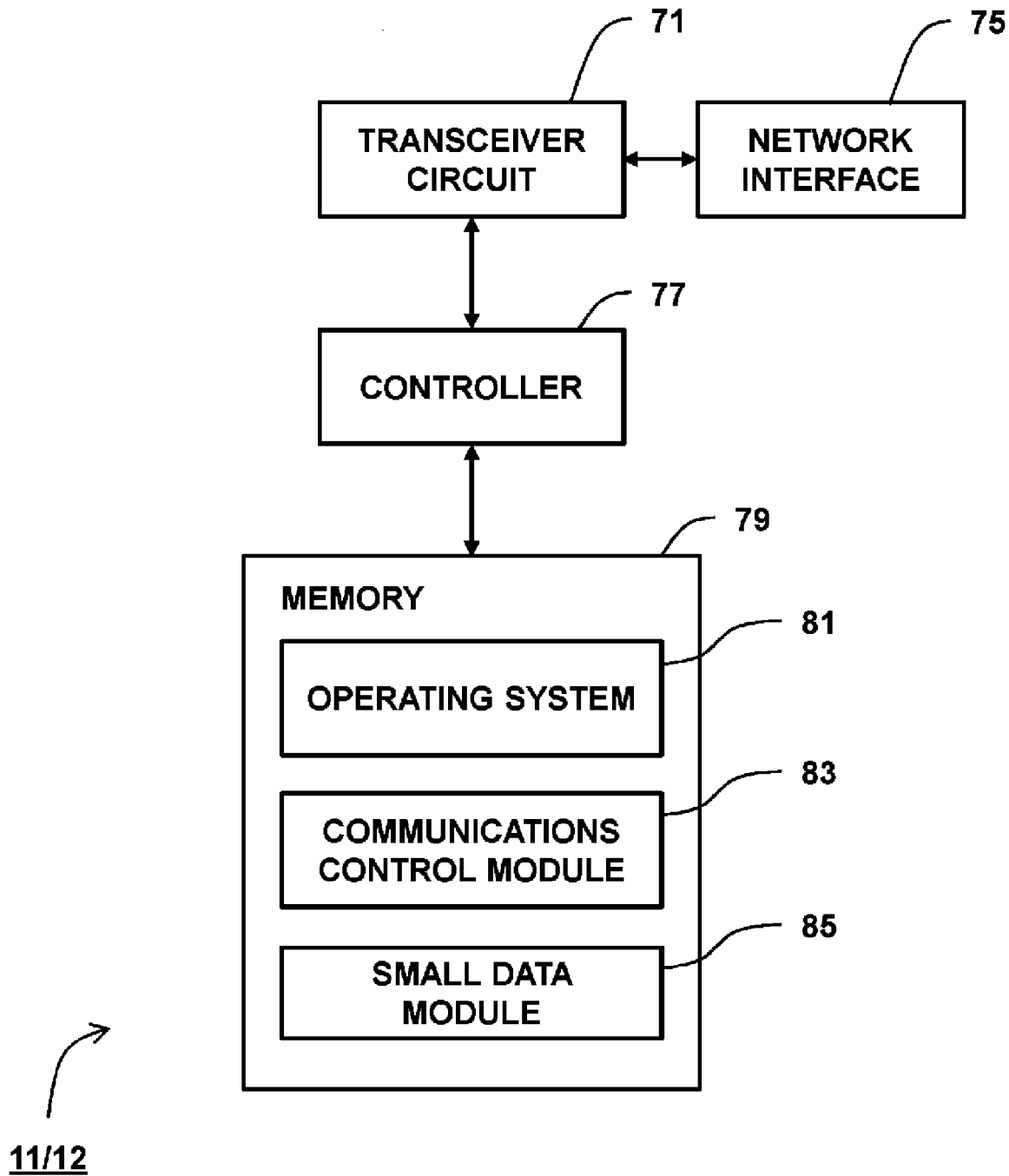
FIG. 4 is a block diagram of a core network node entity forming part of the system shown in FIG. 1.

FIG. 4 is a block diagram illustrating the main components of a generic core network node (or function) shown in FIG. 1, for example, the MME 11 or the S-GW 12. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, the (R)AN node 5, and other core network nodes. The signalling may comprise, for example, NAS signalling and/or small data transmissions between the mobile device 3 and the MME/AMF 11.

DETAILED DESCRIPTION

A more detailed description will now be given of some exemplary ways in which small data transmissions may be performed by a UE in RRC INACTIVE state.

Figure 5:
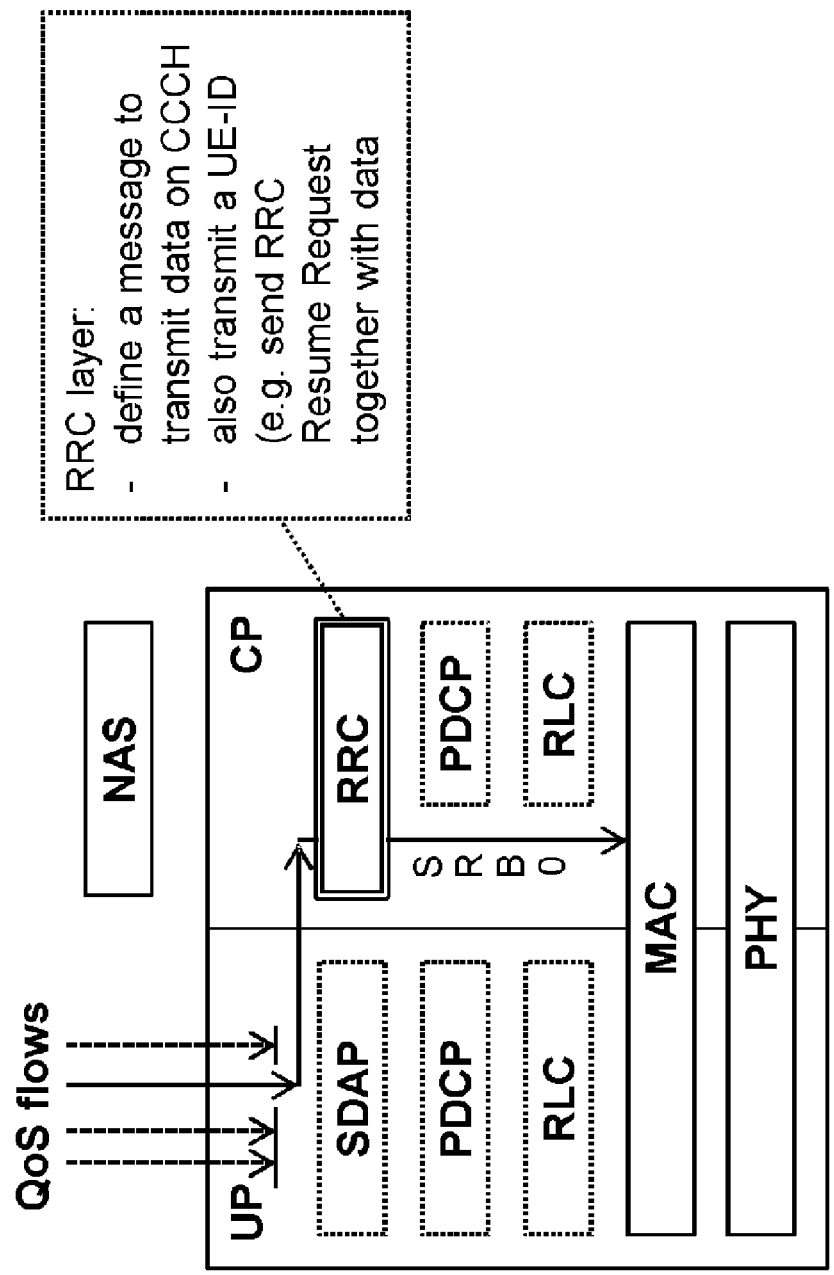
FIG. 5 is a schematic overview of the layers involved in small data transmission in accordance with a first exemplary method.

FIG. 5 is a schematic overview of the layers involved in small data transmission in accordance with a first exemplary method, using Control-Plane signalling.

In more detail, the UE 3 is configured to perform small data transmission via the CCCH channel, using an appropriately formatted RRC message. The RRC message may be a dedicated (e.g. newly defined) RRC message or an RRC message adapted for this purpose. In order to facilitate small data transmissions, the RRC layer (RRC module) is adapted to add an appropriate UE-ID when the UE 3 is transmitting small data. In this example, the UE-ID is added as part of an RRC Resume Request message (e.g. using a 'UE-ID' or 'Resume ID' information element and/or the like) although other messages or information elements may also be used.

Since the SRB0 is configured without PDCP, with Transparent Mode (TM) at RLC, and it uses the CCCH logical channel, there are no PDCP/RLC headers for packets sent via the SRB0 (i.e. functions such as security/header compression, reordering, ARQ, segmentation, etc. associated with PDCP/RLC are not available for such packets).

Moreover, the size of CCCH and CCCH1 are fixed as 48 bits and 64 bits, respectively. In order to allow small data transmissions of other sizes (e.g. larger than 64 bits), a new CCCH message is defined which can accommodate the small data to be transmitted and any necessary RRC message and/or information elements (IEs). It will be appreciated that this new CCCH message may have a variable size (although the size may be capped, e.g. at a multiple of 48 bits or 64 bits).

An exemplary CCCH is shown below, which is referred to as 'UL-CCCH2-Message' (although any other name may be used):

UL-CCCH2-Message

The UL-CCCH2-Message class is the set of RRC messages that may be sent from the UE 3 to the network (e.g. base station 5) on the uplink CCCH2 logical channel.

TABLE 1

UL-CCCH2-Message

```
-- ASN1START
-- TAG-UL-CCCH2-MESSAGE-START
UL-CCCH2-Message ::=     SEQUENCE {
    message              UL-CCCH2-MessageType
}
UL-CCCH2-MessageType ::= CHOICE {
    c1                   CHOICE {
        smallDataTransmission   SmallDataTransmission,
        spare3 NULL,
        spare2 NULL,
        spare1 NULL
    },
    messageClassExtension SEQUENCE { }
}
-- TAG-UL-CCCH1-MESSAGE-STOP
-- ASN1STOP
```

As can be seen, in this example, the contents of the small data transmission (i.e. data from higher layers and any associated RRC IE) are included within an appropriate element of the UL-CCCH2-Message (in this case the 'UL-CCCH2-MessageType' element). Effectively, the 'smallDataTransmission' part of this message is an RRC message which includes the (small) data from higher layers and appropriate information identifying the UE 3 ('UE-ID'). Whilst in this example a new RRC message ('SmallDataTransmission') is used, it will be appreciated that an existing RRC message may be adapted for the purpose of small data transmission, if appropriate.

The information elements of the RRC message may include for example the IEs currently defined for the RRCResumeRequest message. In one example, the RRC message includes the data from the UE 3, an associated UE-ID (for identifying the UE 3 and facilitating UE context retrieval), and one or more security related IE (e.g. a resume MAC-I and/or the like). Based on this message, the network (in this example the base station 5) can decide whether to resume the RRC connection for the UE 3.

Further details of this exemplary RRC message are given below:

SmallDataTransmission

The SmallDataTransmission message is used for the uplink transfer of small data when the UE 3 is in RRC INACTIVE mode.

Signalling radio bearer: SRB0
RLC-SAP: TM
Logical channel: CCCH2
Direction: UE to Network

TABLE 2

SmallDataTransmission message

```
-- ASN1START
-- TAG-RRCRESUMERQUEST-START
SmallDataTransmission ::=     SEQUENCE {
    rrcResumeRequest          RRCResumeRequest-Ies
    SmallData                 OCTET STRING (SIZE (x))
}
RRCResumeRequest-IEs ::=      SEQUENCE {
    resumeIdentity            (Short)I-RNTI-Value
    resumeMAC-I               BIT STRING (SIZE (16)),
    resumeCause               ResumeCause,
    spare                     BIT STRING (SIZE (1))
}
-- TAG-RRCRESUMEREQUEST-STOP
-- ASN1STOP
```

Figure 6:
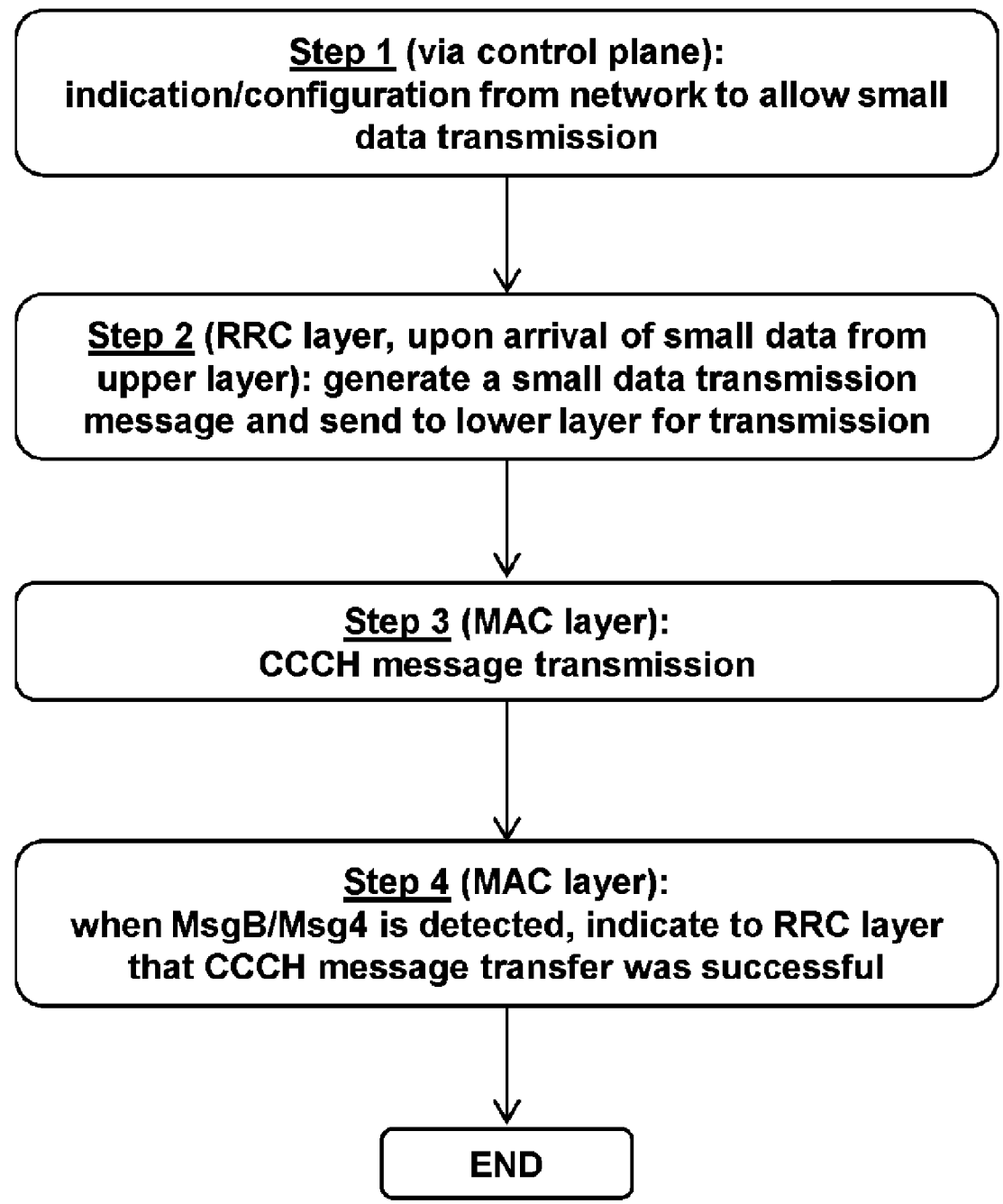
FIG. 6 is a schematic flowchart illustrating the main steps for small data transmission in accordance with the first exemplary method.

FIG. 6 is a schematic flowchart illustrating the main steps for small data transmission in accordance with the first exemplary method.

In step 1, the UE 3 receives an explicit indication/configuration from the network to allow small data transmission via the Control-Plane. The indication/configuration may be sent via an appropriate broadcast message or a unicast message (e.g. an RRC release message or an RRC suspension message and/or the like). Upon receipt of this message, the UE 3 configures any applicable restrictions for the small data transmission service (e.g. transport block size limitation, allowed QoS flows, etc.). If no specific restrictions are configured, small data transmissions may be allowed up to the maximum size of CCCH messages (or Msg3/MsgA), for example the PUSCH transport block (TB) size.

Step 2: when small data arrives from an upper layer, and if the size of the data (optionally with necessary padding and information elements) does not exceed the maximum size defined for small data transmission (and also pass any other restrictions specified or configured), the UE 3 initiates the small data transmission procedure. Specifically, the UE 3 generates the small data transmission message at the RRC layer (using its RRC module) and sends it to lower layers for transmission (i.e. MAC and PHY layers). Although not shown in FIG. 6, if the data from upper layers cannot be sent as 'small data' (e.g. due to its size or due to any other applicable restriction), then the UE 3 generates an appropriately formatted RRC resume request message and sends it to lower layers for transmission so that the data can be transmitted in the normal manner (in RRC CONNECTED mode).

Step 3: in the MAC layer, the CCCH message transmission triggers an appropriate random access procedure, i.e. either a 2-step or 4-step random access procedure. The above described CCCH message is transferred to the network (base station 5) using either a MsgA or a Msg3. It will be appreciated that, instead of using the random access procedure, the CCCH message may also be transmitted via a pre-configured PUSCH resource if it is available.

Step 4: when a response to the message at step 3 is received (e.g. when an MsgB/Msg4 is detected), the MAC layer informs the RRC layer about the success of CCCH message transfer. It will be appreciated that the network may also send an RRC resume message with the MsgB/Msg4 if the network would like to resume the RRC connection in response to the small data transfer.

Beneficially, this method represents a relatively small change in terms of procedures currently specified by 3GPP. The RRC INACTIVE mode still allows suspending all configurations (except SRB0). The method does not require any change of behaviour in the MAC layer (although the grant size configured for MsgA and/or further preamble partitioning for small data transmission purpose may increase).

Figure 7:
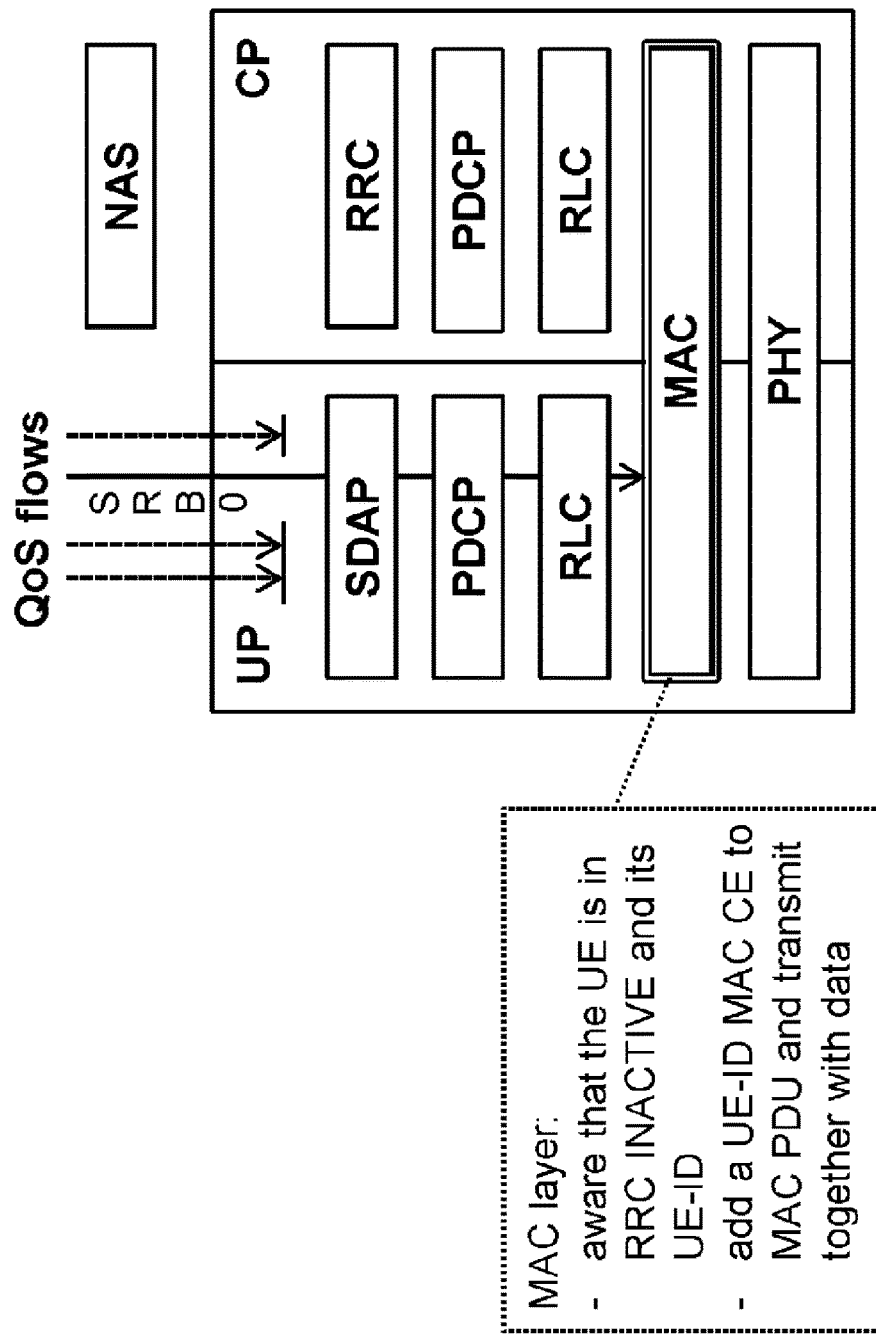
FIG. 7 is a schematic overview of the layers involved in small data transmission in accordance with a second exemplary method.

FIG. 7 is a schematic overview of the layers involved in small data transmission in accordance with a second exemplary method. As can be seen, in this example, User-Plane signalling is used.

In order to facilitate small data transmissions, the MAC layer (MAC module) is aware that the UE 3 is in RRC INACTIVE mode and it is also aware of the associated UE-ID. The MAC layer is configured to add the UE-ID (e.g. using a 'UE-ID' MAC Control Element (CE)) to the MAC Protocol Data Unit (PDU) and transmit the UE-ID together with the data. It will be appreciated that any other suitable information identifying the UE 3 may be used. However, it will be appreciated that the MAC layer does not need to be aware of the UE-ID. Instead, the UE-ID (or any other information suitable for identifying the UE 3) may be included in an RRC message (e.g. in an RRCresumeRequest or similar) and the MAC layer may be configured to multiplex the RRC message with the processed small data and send them out together to the network. In this case, the UE-ID may be included in an information element of the RRC message instead of a MAC CE.

Figure 8:
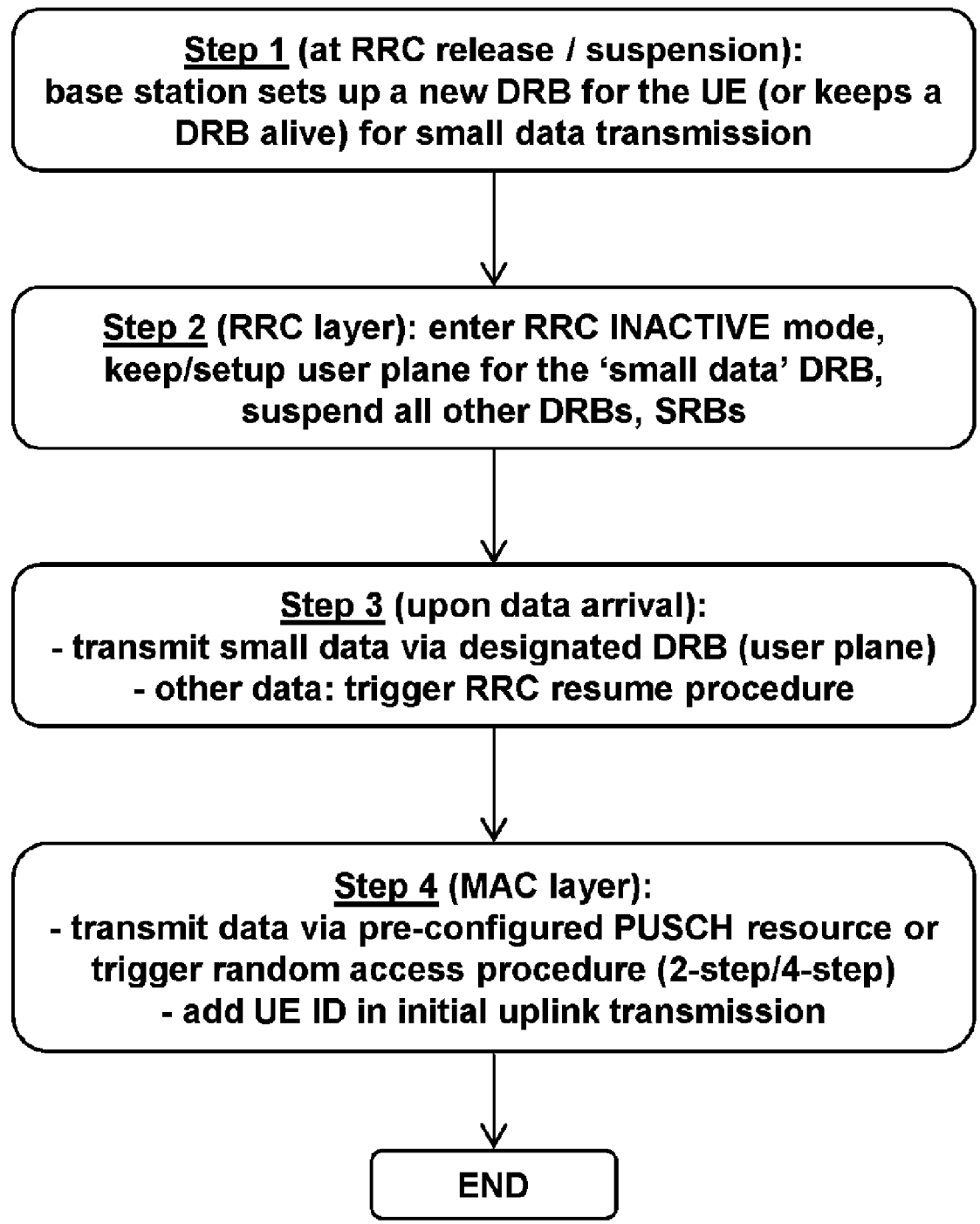
FIG. 8 is a schematic flowchart illustrating the main steps for small data transmission in accordance with the second exemplary method.

FIG. 8 is a schematic flowchart illustrating the main steps for small data transmission in accordance with the second exemplary method.

Step 1: an RRC release (or RRC suspension) message may be sent by the network (the base station 5) to the UE to set up a new DRB (or to keep an existing DRB alive) for small data transmission. Additionally, the network may configure further restrictions for the small data transmission service, for example, which Quality of Service (QoS) Flow Identifier(s) (QFI(s)) can be mapped to this DRB and/or any associated data size/frequency limitation, if applicable. It will be appreciated that a predetermined (e.g. default) configuration may be used for the DRB which would enable the UE 3 to continue using it after any subsequent cell (re-) selection. In other words, the configuration of the DRB may be common for a plurality of base stations, e.g. base stations within a specific tracking area.

Step 2: the RRC layer suspends all other DRBs and SRBs, and keeps (or sets up) the User-Plane protocol for the DRB that is configured to remain active whilst the UE 3 is in the RRC INACTIVE mode. At the end of this step, the UE 3 enters the RRC INACTIVE mode.

Step 3: Whilst in the RRC INACTIVE mode, the UE 3 monitors the higher layers for data. Upon data arrival, if the data conforms to the 'small data' configuration and it belongs to a QFI mapped to the active DRB, the UE 3 processes the data through the appropriate User-Plane protocol of the relevant DRB. It will be appreciated that when the data from the higher layers does not belong to any QFI mapped to the active DRB or the data is larger than the maximum size allowed by the current small data transmission configuration, the UE 3 triggers an appropriate RRC resume procedure (or a random access procedure) so that the data can be transmitted in the normal manner (in RRC CONNECTED mode).

Step 4: at the MAC layer, the data may be transmitted either via a pre-configured PUSCH resource (if available) or by triggering an appropriate (2-step/4-step) random access procedure for uplink transmission. The MAC layer is also configured to add appropriate information identifying the UE 3 (e.g. 'UE ID') to the initial uplink transmission. The information identifying the UE 3 may be included in a MAC CE or in an RRC information element. It will also be appreciated that several uplink transmissions (without resuming the RRC connection) may be used in order to transmit data exceeding the size limit for small data transmission, in which case segmentation may be necessary at the RLC layer.

Beneficially, this method allows the UE 3 to cipher/compress the data. Although in this case the RRC INACTIVE mode is similar to the RRC CONNECTED mode, it results in a lighter User-Plane and lower overhead compared to RRC CONNECTED mode.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

Figure 9:
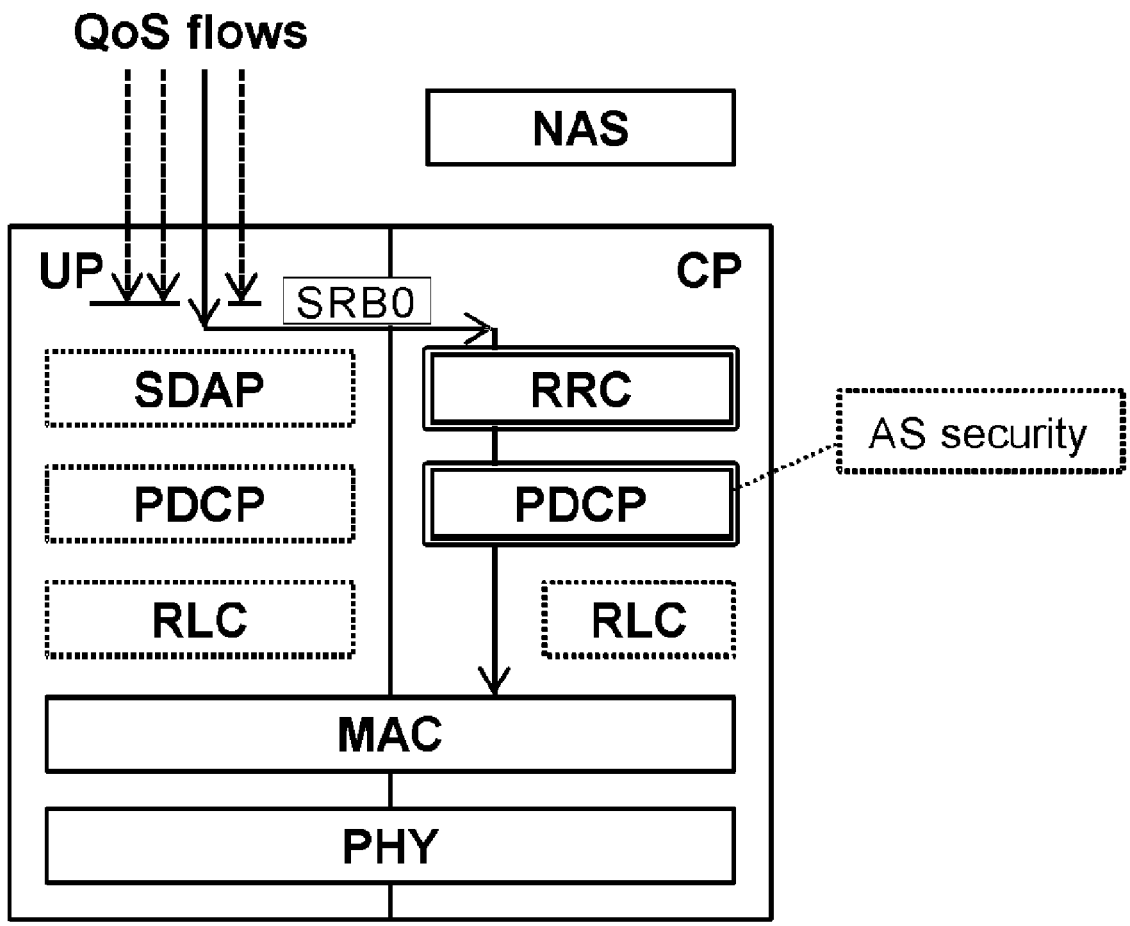
FIG. 9 illustrates schematically some modifications of the first exemplary method.
Figure 10:
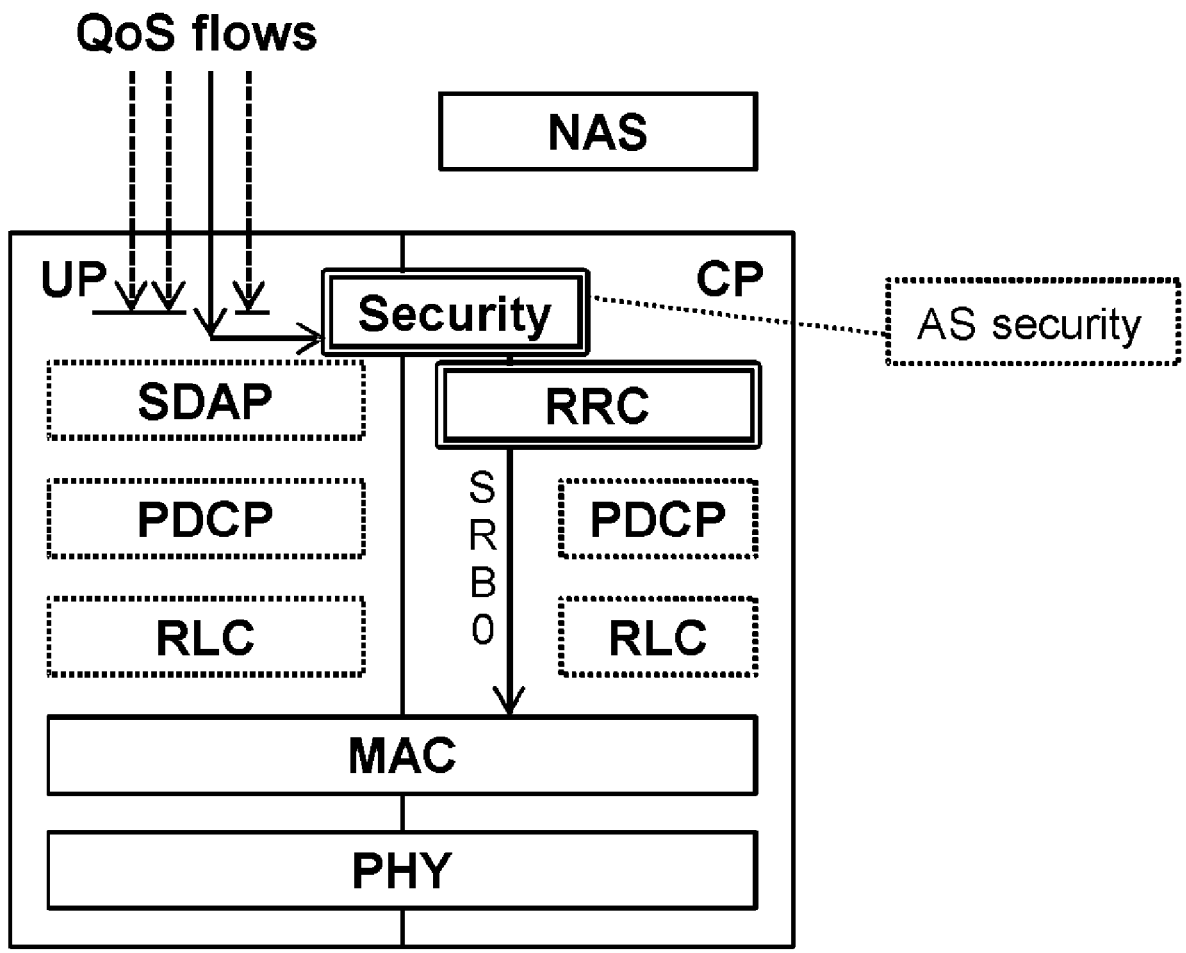
FIG. 10 illustrates schematically some modifications of the first exemplary method.

FIGS. 9 and 10 illustrate some possible modifications of the first exemplary method described above with reference to FIGS. 5 and 6. Specifically, AS security protection may be provided using the PDCP layer (as shown in FIG. 9) or a higher layer (e.g. a dedicated security layer, as shown in FIG. 10). In this case, security operation may be applied to the data part by the PDCP layer or the higher layer.

Although the bearer used for small data transmissions over the Control-Plane is referred to as 'SRB0', it will be appreciated that the SRB used for small data transmission may have a different name in order to distinguish it from the legacy 'SRB0'.

In case of the second method, the following table provides an overview of some potential User-Plane configuration restrictions/changes for shorter headers and lower overall signalling overhead for small data transmissions.

TABLE 3

| Existing | Restrictions/changes |
|---|---|
| SDAP layer: with or without SDAP header depending on configuration. | SDAP layer: restrict to configure without SDAP header. |
| PDCP layer: supports 12 bit/18 bit PDCP sequence number (SN) which ends up with a PDCP header of minimum 2-3 bytes. | PDCP layer: it may be beneficial to introduce a shorter SN (e.g. 7 bits), and target a 1 byte header size. |
| RLC layer: TM mode is currently not applicable to DRB. | RLC layer: since it is one-shot smalt data transmission, it may be beneficial to allow TM mode for DRB subjected to small data transmission (i.e. no header, no ARQ, and no segmentation). |

TABLE 3-continued

| Existing | Restrictions/changes |
| --- | --- |
| MAC layer: MAC sub-header is 2 or 3 bytes for data and contains Logical Channel Identifier (LCID)/ Length (L) fields and so on. | MAC layer: it may be beneficial to avoid LCID and/or L field, may define one or multiple fix size MAC PDU to accommodate data. UE-ID can be added in for identifying the UE. |

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/ or the like.

In the above example embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

In the current 5G architecture, the gNB internal structure may be split into two parts known as the Central Unit (CU) and the Distributed Unit (DU), connected by an F1 interface. It will be appreciated that a CU may be connected to (and control) a plurality of DUs. This enables the use of a 'split' architecture, whereby the, typically 'higher', CU layers (for example, but not necessarily or exclusively), PDCP) and the, typically 'lower', DU layers (for example, but not necessarily or exclusively, RLC/MAC/PHY) to be implemented separately. Thus, for example, the higher layer CU functionality for a number of gNBs may be implemented centrally (for example, by a single processing unit, or in a cloud-based or virtualised system), whilst retaining the lower layer DU functionality locally, in each gNB. It will be appreciated that a CU may perform communication with the next generation core and the DU may perform communication over an air interface with UEs in the vicinity (i.e. in a cell operated by the gNB).

In more detail, a distributed gNB includes the following functional units:

gNB Central Unit (gNB-CU): a logical node hosting Radio Resource Control (RRC), Service Data Adaptation Protocol (SDAP) and Packet Data Convergence Protocol (PDCP) layers of the gNB or RRC and PDCP layers of the En-gNB that controls the operation of one or more gNB-DUs. The gNB-CU terminates the F1 interface connected with the gNB-DU.

gNB Distributed Unit (gNB-DU): a logical node hosting Radio Link Control (RLC), Medium Access Control (MAC) and Physical (PHY) layers of the gNB or En-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP): a logical node hosting the RRC and the control plane part of the PDCP protocol of the gNB-CU for an En-gNB or a gNB. The gNB-CU-CP terminates the E1 interface connected with the gNB-CU-UP and the F1-C interface connected with the gNB-DU.

gNB-CU-User Plane (gNB-CU-UP): a logical node hosting the user plane part of the PDCP protocol of the gNB-CU for an En-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

The User Equipment (or "UE") in the present disclosure is an entity connected to a network via a wireless interface. The UE may also be referred to as "mobile station", "mobile device", "wireless device", or "wireless transmit/receive unit" (WTRU).

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts;

rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to Internet of things' (IoT), using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 4

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an Mobile Virtual Network Operator (MVNO) service, an emergency radio communication system, a Private Branch eXchange (PBX) system, a PHS/Digital Cordless Telecommunications system, a Point of sale (POS) system, an advertise calling system, a Multimedia Broadcast and Multicast Service (MBMS), a Vehicle to Everything (V2X) system, a train radio system, a location related service, a Disaster/Emergency Wireless Communication Service, a community service, a video streaming service, a femto cell application service, a Voice over LTE (VoLTE) service, a charging service, a radio on demand service, a roaming service, an activity monitoring service, a telecom carrier/communication NW selection service, a functional restriction service, a Proof of Concept (PoC) service, a personal information management service, an ad-hoc network/Delay Tolerant Networking (DTN) service, etc.

Further, the above-described UE categories are merely examples of applications of the technical ideas and exemplary embodiments described in the present document. Needless to say, these technical ideas and example embodiments are not limited to the above-described UE and various modifications can be made thereto.

The RRC message may comprise the small data transmission and one or more RRC information elements. The RRC message may comprise information identifying said UE (e.g. a 'UE-ID' information element). The SRB may be 'SRB0'.

The RRC message comprising the small data transmission may be transmitted using a resource associated with a 'configured grant type-1'. Alternatively, the RRC message comprising said small data transmission may be transmitted via a message forming part of a random access procedure (e.g. 'Msg3' or 'MsgA').

Access Stratum security may be provided for small data transmission via a layer other than an RRC layer (e.g. a Packet Data Convergence Protocol (PDCP) layer and/or a dedicated security layer).

The determining by the UE may comprise determining whether a Quality of Service (QoS) Flow Identifier (QFI) associated with the small data transmission can be mapped to the SRB, and the method may comprise transmitting the RRC message comprising small data transmission based on a result of the determination.

The information configuring small data transmissions may comprise information identifying a size limit for said CCCH and the determining by the UE may comprise determining that said small data transmission does not exceed said size limit.

The information identifying the UE may comprise a Medium Access Control (MAC) layer Control Element (CE) (e.g. a 'UE-ID' MAC CE) or an RRC information element.

The processing by the UE may comprise segmenting said uplink data to form a plurality of small data transmissions and adding the information identifying the UE to at least one of the plurality of small data transmissions.

The determining by the UE may comprise determining whether a Quality of Service (QoS) Flow Identifier (QFI) associated with the small data transmission can be mapped to the DRB, and the method may comprise transmitting the small data transmission and the information identifying the UE based on a result of the determination.

The processing of uplink data to form a small data transmission may comprise configuring at least one layer of the DRB for small data transmission. For example, the configuring may comprise at least one of: configuring a Service Data Adaptation Protocol (SDAP) layer without an SDAP header; using a shortened Packet Data Convergence Protocol (PDCP) sequence number (e.g. 7 bits) and/or using a 1 byte PDCP header size; using a Transparent Mode (TM) for small data transmission using said DRB; configuring a Medium Access Control (MAC) layer without a Logical Channel Identifier (LCID) and/or a Length field; and configuring a fixed size MAC Protocol Data Unit (PDU) for small data transmission.

Various other modifications will be apparent to those skilled in the art and will not be described in further detail here.

(Supplementary Note 1)
A method performed by a user equipment (UE) for small data transmission in Radio Resource Control (RRC) Inactive state, the method comprising:
receiving information configuring small data transmissions via a control-plane;
determining, whilst the UE is in the RRC Inactive state, whether there is uplink data to be sent as a small data transmission;
generating an RRC message comprising said small data transmission; and
transmitting said RRC message comprising said small data transmission using a Signalling Radio Bearer (SRB) provided via a Common Control Channel (CCCH).

(Supplementary Note 2)
The method according to supplementary note 1, wherein the RRC message comprises said small data transmission and one or more RRC information elements.

(Supplementary Note 3)
The method according to supplementary note 1 or 2, wherein the RRC message comprises information identifying said UE (e.g. a 'UE-ID' information element).

(Supplementary Note 4)
The method according to any of supplementary notes 1 to 3, wherein the SRB is an 'SRB0'.

(Supplementary Note 5)
The method according to any of supplementary notes 1 to 4, wherein said RRC message comprising said small data transmission is transmitted using a resource associated with a 'configured grant type-1'.

(Supplementary Note 6)
The method according to any of supplementary notes 1 to 4, wherein said RRC message comprising said small data transmission is transmitted via a message forming part of a random access procedure (e.g. 'Msg3' or 'MsgA').

(Supplementary Note 7)
The method according to any of supplementary notes 1 to 6, wherein Access Stratum security is provided for said small data transmission via other than an RRC layer (e.g. a Packet Data Convergence Protocol (PDCP) layer and/or a dedicated security layer).

(Supplementary Note 8)
The method according to any of supplementary notes 1 to 7, wherein said determining comprises determining whether a Quality of Service (QoS) Flow Identifier (QFI) associated with the small data transmission can be mapped to the SRB, and wherein the method comprises transmitting said RRC message comprising said small data transmission based on a result of said determination.

(Supplementary Note 9)
The method according to any of supplementary notes 1 to 8, wherein said information configuring small data transmissions comprises information identifying a size limit for said CCCH and wherein said determining comprises determining that said small data transmission does not exceed said size limit.

(Supplementary Note 10)
A method performed by a user equipment (UE) for small data transmission in Radio Resource Control (RRC) Inactive state, the method comprising:
receiving information configuring small data transmissions in the RRC Inactive state;
determining, when the UE is in the RRC Inactive state, whether there is uplink data to be sent as a small data transmission;
processing the uplink data to form a small data transmission and adding information identifying the UE; and
transmitting said small data transmission and said information identifying the UE using a Data Radio Bearer (DRB) based on the received information.

(Supplementary Note 11)
The method according to supplementary note 10, wherein said small data transmission is transmitted using a resource associated with a 'configured grant type-1'.

(Supplementary Note 12)
The method according to supplementary note 10, wherein said small data transmission is transmitted via a message forming part of a random access procedure (e.g. 'Msg3' or 'MsgA').

(Supplementary Note 13)
The method according to any of supplementary notes 10 to 12, wherein said information identifying the UE comprises a Medium Access Control (MAC) Control Element (CE) (e.g. a 'UE-ID' MAC CE) or an RRC information element.

(Supplementary Note 14)
The method according to any of supplementary notes 10 to 13, wherein said processing comprises segmenting said uplink data to form a plurality of small data transmissions and adding said information identifying the UE to at least one of said plurality of small data transmissions.

(Supplementary Note 15)
The method according to any of supplementary notes 10 to 14, wherein said determining comprises determining whether a Quality of Service (QoS) Flow Identifier (QFI) associated with the small data transmission can be mapped to the DRB, and wherein the method comprises transmitting said small data transmission and said information identifying the UE based on a result of said determination.

(Supplementary Note 16)
The method according to any of supplementary notes 10 to 15, wherein said processing the uplink data to form a small data transmission comprises configuring at least one layer of said DRB for small data transmission.

(Supplementary Note 17)
The method according to supplementary note 16, wherein said configuring the at least one layer of said DRB for small data transmission comprises at least one of:
configuring a Service Data Adaptation Protocol (SDAP) layer without an SDAP header;
using a shortened Packet Data Convergence Protocol (PDCP) sequence number (e.g. 7 bits) and/or using a 1 byte PDCP header size;
using a Transparent Mode (TM) for small data transmission using said DRB;
configuring a Medium Access Control (MAC) layer without a Logical Channel Identifier (LCID) and/or a Length field; and
configuring a fixed size MAC Protocol Data Unit (PDU) for small data transmission.

(Supplementary Note 18)
A method performed by a communication apparatus of a radio access network for communicating with a user equipment (UE) for small data transmission in a Radio Resource Control (RRC) Inactive state, the method comprising:
transmitting information configuring small data transmissions via a control-plane; and
receiving, from the UE whilst the UE is in the RRC Inactive state, an RRC message comprising a small data transmission using a Signalling Radio Bearer (SRB) provided via a Common Control Channel (CCCH).

(Supplementary Note 19)
A method performed by a communication apparatus of a radio access network for communicating with a user equipment (UE) for small data transmission in Radio Resource Control (RRC) Inactive state, the method comprising:
transmitting information configuring small data transmissions in the RRC Inactive state; and
receiving, from the UE whilst the UE is in the RRC Inactive state, a small data transmission and information identifying the UE using a Data Radio Bearer (DRB) based on the transmitted information.

(Supplementary Note 20)
A user equipment (UE) for small data transmission in Radio Resource Control (RRC) Inactive state, the UE comprising:
means for receiving information configuring small data transmissions via a control-plane;
means for determining, whilst the UE is in the RRC Inactive state, whether there is uplink data to be sent as a small data transmission;
means for generating an RRC message comprising said small data transmission; and
means for transmitting said RRC message comprising said small data transmission using a Signalling Radio Bearer (SRB) provided via a Common Control Channel (CCCH).

(Supplementary Note 21)
A user equipment (UE) for small data transmission in Radio Resource Control (RRC) Inactive state, the UE comprising:
means for receiving information configuring small data transmissions in the RRC Inactive state;
means for determining, when the UE is in the RRC Inactive state, whether there is uplink data to be sent as a small data transmission;
means for processing the uplink data to form a small data transmission and adding information identifying the UE; and
means for transmitting said small data transmission and said information identifying the UE using a Data Radio Bearer (DRB) based on the received information.

(Supplementary Note 22)
Communication apparatus of a radio access network for communicating with a user equipment (UE) for small data transmission in a Radio Resource Control (RRC) Inactive state, the communication apparatus comprising:
means for transmitting information configuring small data transmissions via a control-plane; and
means for receiving, from the UE whilst the UE is in the RRC Inactive state, an RRC message comprising a small data transmission using a Signalling Radio Bearer (SRB) provided via a Common Control Channel (CCCH).

(Supplementary Note 23)
Communication apparatus of a radio access network for communicating with a user equipment (UE) for small data transmission in Radio Resource Control (RRC) Inactive state, the communication apparatus comprising:
means for transmitting information configuring small data transmissions in the RRC Inactive state; and
means for receiving, from the UE whilst the UE is in the RRC Inactive state, a small data transmission and information identifying the UE using a Data Radio Bearer (DRB) based on the transmitted information.

This application is based upon and claims the benefit of priority from United Kingdom Patent Application No. 2004520.9, filed on Mar. 27, 2020, the disclosure of which is incorporated herein in its entirety by reference.

What is claimed is:
1. A method performed by a user equipment (UE), the method comprising:
receiving a Radio Resource Control (RRC) release message for configuring a data radio bearer (DRB) enabled for small data transmission in a RRC Inactive state; and
transmitting, while the UE is in the RRC Inactive state, a small data the DRB configured by the RRC release message.
2. The method according to claim 1, wherein
the transmitting is performed by using a resource associated with a 'configured grant type-1'.
3. The method according to claim 1, wherein
the transmitting is performed via a message forming part of a random access procedure.

4. The method according to claim 1, further comprising:
adding information identifying the UE to the small data, wherein the information is included in a Medium Access Control (MAC) Control Element (CE) or an RRC information element.

5. The method according to claim 4, further comprising:
segmenting uplink data to form a plurality of the small data,
wherein the adding is performed by adding the information identifying the UE to at least one of the plurality of the small data.

6. The method according to claim 1, further comprising:
determining whether a Quality of Service (QOS) Flow Identifier (QFI) associated with the small data can be mapped to the DRB, and
the transmitting is performed based on a result of the determining.

7. The method according to claim 1, further comprising:
configuring at least one layer of the DRB.

8. The method according to claim 1, wherein
the RRC release message includes information indicating whether a signaling radio bearer (SRB) is configured for the small data transmission in the RRC Inactive state.

9. The method according to claim 1, further comprising:
triggering a RRC resume procedure in a case where a size of the small data is larger than an allowed maximum size.

10. The method according to claim 7, wherein the configuring the at least one layer of the DRB includes at least one of:
configuring a Service Data Adaptation Protocol (SDAP) layer without an SDAP header;
using a shortened Packet Data Convergence Protocol (PDCP) sequence number and/or using a 1 byte PDCP header size;
using a Transparent Mode (TM) for the small data transmission using the DRB;
configuring a Medium Access Control (MAC) layer without a Logical Channel Identifier (LCID) and/or a Length field; and
configuring a fixed size MAC Protocol Data Unit (PDU) for the small data.

11. A method performed by an access network node, the method comprising:
transmitting a Radio Resource Control (RRC) release message for configuring a data radio bearer (DRB) enabled for small data transmission in a RRC Inactive state; and
receiving, from the UE while the UE is in the RRC Inactive state, a small data using the DRB configured by the RRC release message.

12. A user equipment (UE) comprising:
a memory storing instructions; and
at least one processor configured to process the instructions to:
receive a Radio Resource Control (RRC) release message for configuring a data radio bearer (DRB) enabled for small data transmission in a RRC Inactive state;
transmit, while the UE is in the RRC Inactive state, a small data using the DRB configured by the RRC release message.

13. An access network node comprising:
a memory storing instructions; and
at least one processor configured to process the instructions to:
transmit a Radio Resource Control (RRC) release message for configuring a data radio bearer (DRB) enabled for small data transmission in a RRC Inactive state; and
receive, from the UE while the UE is in the RRC Inactive state, a small data using the DRB configured by the RRC release message.

\* \* \* \* \*